United States Patent
Dove et al.

(10) Patent No.: US 6,310,891 B1
(45) Date of Patent: Oct. 30, 2001

(54) METHOD OF SCHEDULING TIME DIVISION MULTIPLEX (TDM) CELLS IN A SYNCHRONOUS OPTICAL NETWORK (SONET) FRAME

(75) Inventors: Jason W. Dove, Novato; Rodney Witel, Rohnert Park; Brian Semple, Novato, all of CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 08/993,004

(22) Filed: Dec. 18, 1997

(51) Int. Cl.$^7$ ................................. H04J 3/10; H04J 1/08
(52) U.S. Cl. ........................ 370/470; 370/473; 370/490
(58) Field of Search ................................. 370/470, 490, 370/537, 395, 391, 352, 397, 486, 487, 493, 473, 442, 494, 474, 528, 527; 359/123, 135

(56) References Cited

U.S. PATENT DOCUMENTS

| | | | |
|---|---|---|---|
| 3,988,545 | * 10/1976 | Kuemmerle et al. | 370/537 |
| 4,035,580 | * 7/1977 | Dieter et al. | 370/503 |
| 4,488,293 | * 12/1984 | Haussmann et al. | 370/535 |
| 5,208,807 | * 5/1993 | Gass et al. | 370/458 |
| 5,327,428 | * 7/1994 | Van As et al. | 370/353 |
| 5,392,280 | * 2/1995 | Zheng | 370/353 |
| 5,396,494 | * 3/1995 | Roposh | 370/439 |
| 5,495,478 | 2/1996 | Wilkinson et al. | 370/399 |
| 5,526,349 | 6/1996 | Diaz et al. | 370/392 |
| 5,528,592 | 6/1996 | Schibler et al. | 370/397 |
| 5,537,400 | 7/1996 | Diaz et al. | 370/412 |
| 5,592,480 | 1/1997 | Carney et al. | 370/347 |
| 5,612,958 | 3/1997 | Sannino | 370/394 |
| 5,623,491 | 4/1997 | Skoog | 370/397 |
| 5,629,937 | 5/1997 | Hayter et al. | 370/233 |
| 5,664,114 | 9/1997 | Krech, Jr. et al. | 709/234 |
| 5,671,249 | 9/1997 | Andersson et al. | 375/211 |
| 5,987,026 | * 11/1999 | Holland | 370/353 |

* cited by examiner

*Primary Examiner*—Hassan Kizou
*Assistant Examiner*—Saba Tsegaye
(74) *Attorney, Agent, or Firm*—Smith, Danamraj & Youst P.C.

(57) ABSTRACT

A method of scheduling a plurality of time multiplexed cells and a plurality of asynchronous cells in a temporal frame, which consists of first and second subframes, comprises the steps of assigning the time multiplexed cells or clusters of time multiplexed cells interspersed by a first plurality of asynchronous cells to the first frame and assigning a second plurality of asynchronous cells to the second subframe.

55 Claims, 2 Drawing Sheets

METHOD OF SCHEDULING TIME DIVISION MULTIPLEX (TDM) CELLS IN A SYNCHRONOUS OPTICAL NETWORK (SONET) FRAME

BACKGROUND OF THE INVENTION

1. Field of the Invention

The present invention relates to a method of scheduling a plurality of cells in a temporal frame, and more particularly, to a method of scheduling a plurality of time division multiplex (TDM) cells in a synchronous optical network (SONET) frame.

2. Background

The telecommunications industry has developed schemes for transmitting telephony signals, which are usually in the form of time division multiplex (TDM) signals that have been formatted into asynchronous transfer mode (ATM) cells over a physical layer interface, such as a synchronous optical network (SONET) interface. The SONET uses an industry-standard framed transmission format in which signals are transmitted in SONET superframes each having a duration of 1 ms. Each SONET superframe is divided into 8 SONET frames each having a duration of 125 μs. Each SONET frame includes a plurality of cells each adapted to carry data in the ATM format. Digital video signals and computer data signals are usually carried in the ATM format whereas telephony signals are usually carried in the TDM format. Systems and methods have been developed to carry both telephony and digital video signals over the same communications network. Methods have been developed to convert the TDM format into the ATM format such that both telephony and digital video signals can be transmitted over a single physical layer interface.

However, when the SONET frames are received by a SONET octal bus over a plurality of ports, address collisions may occur between cells of different SONET frames. For example, if a TDM cell in a frame overlaps with another TDM cell in an adjacent frame when received by a receive interface such as a SONET octal bus, an address collision occurs which causes jitters that are undesirable for the demultiplexing of the TDM signals. Therefore, there is a need for a method of scheduling the TDM cells in the SONET frames to avoid an address collision between the TDM cells of different frames even if the frames are received by the receive interface with some overlap.

SUMMARY OF THE INVENTION

In view of the above problem, the present invention provides a method of scheduling a plurality of time multiplexed cells and a plurality of asynchronous cells within a temporal frame such that an address collision between the time multiplexed cells in adjacent frames may be avoided. The method of scheduling a plurality of cells in a temporal sequence in a frame divided into a first subframe and a second subframe roughly comprises the steps of:

(a) assigning a plurality of time multiplexed cells and a first plurality of asynchronous cells to the first subframe, the time multiplexed cells temporally interspersed from each other by at least one asynchronous cell in the first plurality of asynchronous cells; and (b) assigning a second plurality of asynchronous cells to the second subframe.

In a further embodiment, the duration of the first subframe is no more than three times the duration of the second subframe. The time multiplexed cells may be formatted in an unpacked mode or a packed mode. The time multiplexed cells may be time division multiplexed (TDM) cells while the asynchronous cells may be asynchronous transfer mode (ATM) cells.

Advantageously, the method according to the present invention satisfies the need for avoiding jitters at the receive interface caused by an address collision between the time multiplexed cells in the different frames even if they are received with some temporal overlap by the receive interface. A further advantage of the present invention is that it allows the asynchronous cells, which may carry wideband signals such as video signals, to retain a relatively wide bandwidth when they are scheduled with the time multiplexed cells in the same frame.

BRIEF DESCRIPTION OF THE DRAWINGS

The invention will be described with respect to particular embodiments thereof, and references will be made to the drawings in which.

DETAILED DESCRIPTION

The present invention provides a method of scheduling a plurality of cells, including time multiplexed cells such as time division multiplex (TDM) cells and asynchronous cells such as asynchronous transfer mode (ATM) cells in a temporal frame such as a synchronous optical network (SONET) frame, to eliminate an address collision between the time multiplexed cells of adjacent frames if there is some time overlap between the frames when they are received by a receive interface, such as a SONET octal bus. An industry-standard SONET superframe has a duration of 1 ms and consists of 8 SONET frames each having a duration of 125 μs. The SONET frames are usually received by a SONET receive interface, for example, an octal bus through a plurality of single-port queues, with a possibility of a temporal overlap of at least some cells in the adjacent frames when they are received by the receive interface. The method according to the present invention is able to eliminate the collision of data addresses of TDM cells of different frames if some temporal overlap occurs between the different frames.

Figure 1:
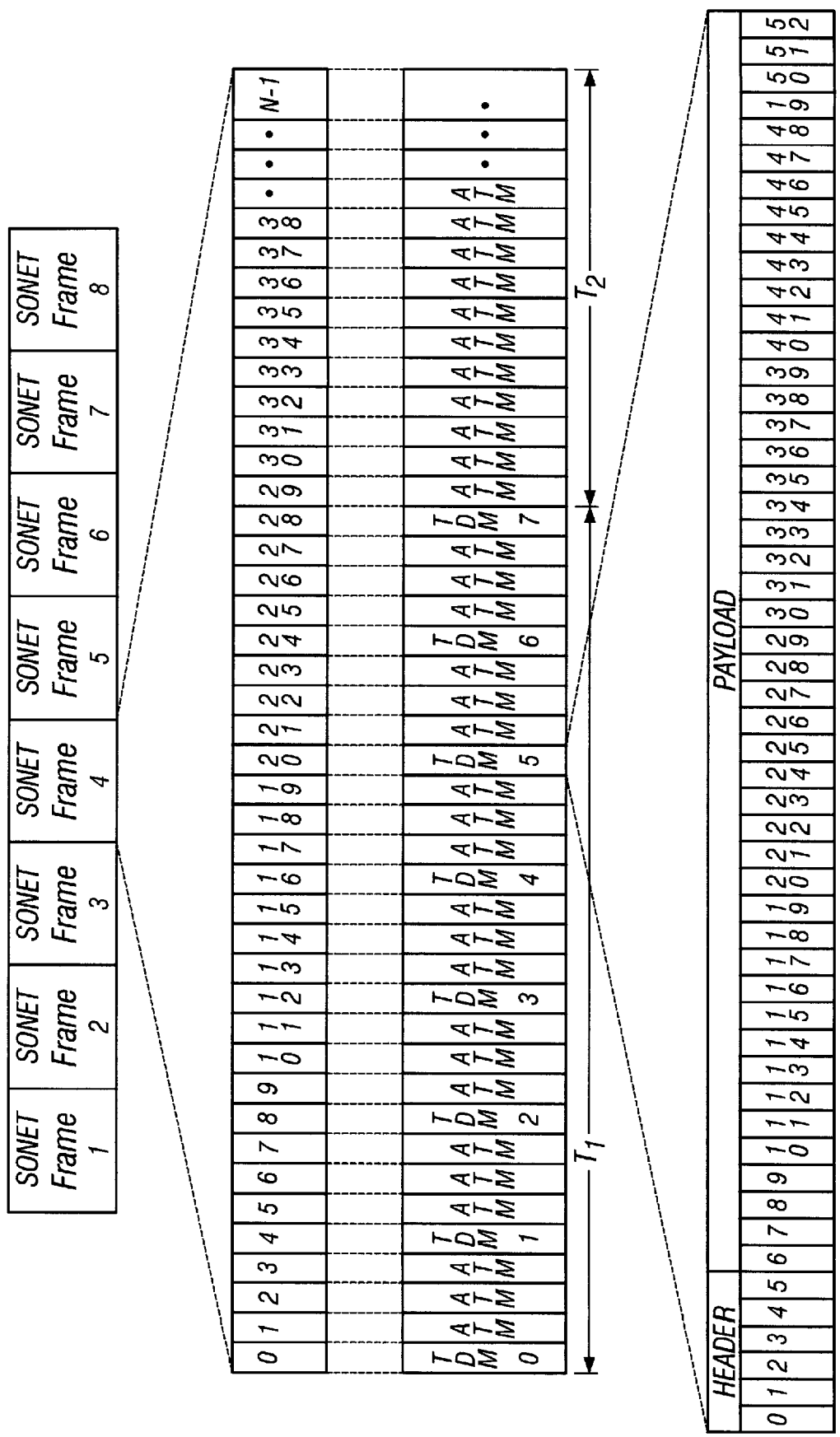
FIG. 1 is a diagram illustrating the scheduling of time division multiplexed (TDM) and asynchronous transfer mode (ATM) cells in a synchronous optical network (SONET) frame according to the present invention in which the TDM cells are formatted in an unpacked mode.

An industry-standard SONET frame, which has a duration of 125 μs, contains 44 ATM cells at ECR3, or 88 ATM cells at ECR6, or 176 ATM cells at ECR12. "ECR" stands for "effective cell rate" and is an industry-standard term which is known to a person skilled in the art for denoting the rate of cell transmission. In FIG. 1, which shows a diagram illustrating the scheduling of TDM cells with ATM cells in a SONET frame, SONET Frame 4, for example, is divided into a number of cells N, with the cells in Frame 4 numbered consecutively from 0 to N−1. For cell transmissions at presently available industry-standard transmission frequencies, N=44, 88 and 176 at ECR3, ECR6 and ECR12, respectively.

The SONET frame is divided into a first subframe with a duration of $T_1$ and a second subframe with a duration of $T_2$. The second subframe is subsequent in temporal sequence to the first subframe, and the sum of $T_1$ and $T_2$ equals the SONET frame duration of 125 µs. The method according to the present invention roughly comprises the steps of:

(a) assigning a plurality of synchronous cells and a first plurality of asynchronous cells to the first subframe, the synchronous cells temporally interspersed from each other by at least one asynchronous cell in the first plurality of asynchronous cells; and (b) assigning a second plurality of asynchronous cells to the second subframe.

The method according to the present invention is applicable to the scheduling of TDM and ATM cells in a SONET frame. In FIG. 1, one TDM cell occupies a cell slot with the same slot duration as that of an ATM cell. Each SONET cell slot has a duration of 2.72 µs at ECR3, 1.360 µs at ECR6, or 680 ns at ECR12. When only one TDM cell is assigned to a standard SONET cell slot, the TDM cell in the SONET frame is said to be in an unpacked mode, which is conventional and known to a person skilled in the art.

In a further embodiment, the number of cells in the first subframe is no more than 3 times the number of cells in the second subframe, such that the first subframe which includes the TDM cells occupies no more than ¾ of the time period of the SONET frame. Within the first subframe, the TDM cells may be interspersed from each other by a single ATM cell or a fixed number of ATM cells. The second subframe, which is not assigned any TDM cells, contains a plurality of ATM cells. The ATM cells in the second subframe may be adapted to carry digital video signals or computer data signals. Alternatively, the ATM cells in the second subframe may simply comprise a plurality of empty cells with a bandwidth reserved for the transmission of wideband signals whenever such a need arises. The ATM cells in the first subframe which are assigned to the cell slots interspersed between the TDM cells may also be adapted to carry digital video signals or computer data signals. Alternatively, the ATM cells positioned between the TDM cells may simply comprise empty cells.

A typical unpacked TDM cell contains 53 bytes of data including 5 header bytes and 48 payload bytes. The header bytes are numbered consecutively from 0 to 4 while the payload bytes are numbered consecutively from 5 to 52. As described above, each of the TDM and ATM cells has a duration of 2.72 µs for ECR3, 1.360 µs for ECR6, or 680 ns for ECR12.

The TDM cells are scheduled only in the first subframe. For example, Cell Slot 0 of SONET Frame 4 may be assigned the first TDM cell, designated as TDM 0. As illustrated in FIG. 1, the TDM cells are interspersed from each other by three ATM cells in the first subframe. The cells in other SONET frames are scheduled in the same manner as in SONET Frame 4. If there is an overlap between adjacent frames, for example, between Frame 4 and Frame 5, some of the TDM cells in Frame 5 may be received simultaneously with some of the ATM cells in the second subframe of SONET Frame 4 by the receive interface. In this manner, any conflict near the boundary between SONET Frames 4 and 5 is between some of the ATM cells of the second subframe of Frame 4 and some of the TDM cells of Frame 5, thereby avoiding an address collision between the TDM cells of Frames 4 and 5.

Since the TDM and ATM cells have different signal formats when the TDM cells are demultiplexed, the overlapping of some of the TDM cells and some of the ATM cells in the adjacent frames may not be critical to the reception of the TDM cells in the SONET frames. It may be desirable in some applications to prioritize the avoidance of any address collision between different TDM cells, which may carry telephony signals, over the avoidance of simultaneous reception of different ATM cells, which may carry digital video signals. When the first subframe duration $T_1$ is three times the second subframe duration $T_2$, for example, the adjacent frames may overlap by as much as ¼ of the frame duration. Therefore, address collision between the TDM cells of adjacent frames can be avoided if there is some overlap of the frame boundaries as long as the duration of the overlap does not exceed the second subframe duration.

Figure 2:
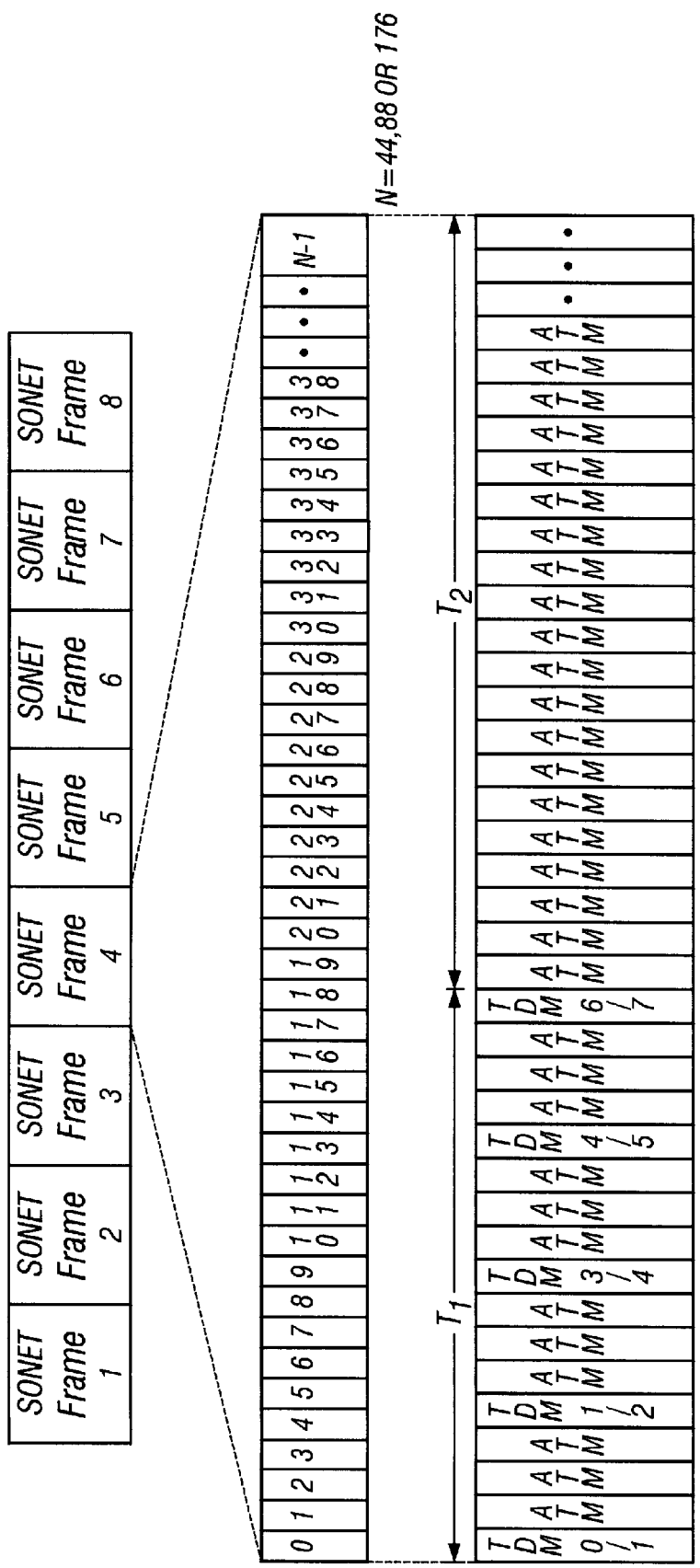
FIG. 2 is a diagram illustrating the scheduling of TDM and ATM cells in a SONET frame according to the present invention in which the TDM cells are formatted in a packed mode.

FIG. 2 shows a diagram illustrating the scheduling of TDM and ATM cells in a SONET frame in a manner similar to that which is shown in FIG. 1 and described above except that the TDM cells are placed in the SONET cell slots in a packed mode. Each SONET frame, for example, Frame 4, is divided into a first subframe with a duration of $T_1$ and a second subframe with a duration of $T_2$. As described above, each SONET frame contains 44 cell slots for ECR3, or 88 cells slots for ECR6, or 176 cell slots for ECR12. In a packed mode, the TDM cells are arranged in clusters each consisting of a fixed number of TDM cells. Furthermore, each cluster may consist of a non-integral number of TDM cells. For example, each TDM cluster may contain 1.5 TDM cells of data. Each TDM cluster, which may contain more TDM data than that which can be contained in a standard unpacked TDM cell, is placed within one of the SONET cell slots designated to carry the TDM data in the first subframe. In the illustrative embodiment shown in FIG. 2, the first TDM cluster, which is assigned to SONET Cell Slot 0, contains the entirety of TDM Cell 0 and ½ of TDM Cell 1. The other half of TDM Cell 1 and the entirety of TDM Cell 2 are contained in a second TDM cluster which is assigned to the SONET Cell Slot 4. Since the TDM clusters and the ATM cells occupy their respective SONET cell slots, the TDM clusters and the ATM cells each have an equal duration. Therefore, the slot duration which is capable of carrying one ATM cell can be adapted to carry 1.5 TDM cells in a packed mode, thereby reducing the number of cell slots allocated to the TDM cells in the first subframe.

As illustrated in FIG. 2, eight TDM cells are packed in six TDM clusters, each cluster occupying only one cell slot. In contrast, TDM cells in an unpacked mode each occupy a SONET cell slot as illustrated in FIG. 1, which requires 8 cell slots in the first subframe to carry the same number of TDM cells as those carried in 6 cell slots in the packed mode as illustrated in FIG. 2. The first subframe duration $T_1$ can be reduced to allow for a longer second subframe duration $T_2$ if the TDM cells are in a packed mode, thereby allowing a larger buffer zone when the boundaries of the adjacent SONET frames overlap each other upon reception by a receive interface. Alternatively, the first and second subframe durations may be set at the same ratio, for example, 3 to 1, as in the case of the unpacked mode for the TDM cells illustrated in FIG. 1 and described above, to allow the first subframe to carry more TDM data. The placement of TDM cells in a packed mode wherein each TDM cluster contains 1.5 TDM cells is conventional and known to a person skilled in the art.

The TDM clusters in the first subframe may be interspersed from each other by a single ATM cell occupying a standard SONET cell slot or a fixed number of ATM cells. For example, as illustrated in FIG. 2, three ATM cells occupying Cell Slots 1–3 are positioned to separate the first TDM cluster, which occupies Cell Slot 0 and contains TDM Cell 0 and ½ of TDM Cell 1, from the second TDM cluster, which occupies Cell Slot 4 and contains TDM Cell 2 and the other half of TDM Cell 1. The ATM cells positioned between the clusters of TDM cells may be adapted to carry digital video or computer data signals, or may simply comprise empty cells that are reserved for carrying the ATM signals whenever such a need arises. Similarly, the ATM cells in the second subframe may carry digital video or computer data signals, or alternatively, comprise empty cells with a relatively wide bandwidth reserved for the transmission of wideband signals such as digital video or computer data signals whenever such a need arises.

In the embodiments described above, a number of assumptions were made in order to simplify the description of the method in view of the existing industry-standard communications interfaces and formats. For example, it was assumed that the temporal frames are SONET frames, that the time multiplexed cells are TDM cells, and that the asynchronous cells are ATM cells. However, none of these assumptions are mandatory in a different embodiment. It will be appreciated that the method of the present invention is also applicable to the scheduling of cells in temporal frames that use other transmission formats, either presently available or to be developed in the future. The principles of the invention would nonetheless still apply.

The invention has been described with respect to particular embodiments thereof, and numerous modifications can be made which are within the scope of the invention as set forth in the claims.

What is claimed is:

1. A method of scheduling a plurality of cells in a temporal sequence in a frame consisting of a first subframe and a second subframe subsequent to the first subframe, the method comprising the steps of:
    (a) assigning a plurality of time multiplexed cells and a first plurality of asynchronous cells to the first subframe, the time multiplexed cells temporally interspersed from each other by at least one of the first plurality of asynchronous cells; and
    (b) assigning a second plurality of asynchronous cells to the second subframe.

2. The method of claim 1, wherein the first and second subframes comprise first and second numbers of cells, respectively, the first number of cells being three times the second number of cells.

3. The method of claim 1, wherein the first and second subframes comprise first and second numbers of cells, respectively, the first number of cells being less than three times the second number of cells.

4. The method of claim 1, wherein the time multiplexed cells are temporally interspersed from each other by a fixed number of the first plurality of asynchronous cells.

5. The method of claim 1, wherein the first plurality of asynchronous cells comprise a first plurality of empty cells.

6. The method of claim 1, wherein the second plurality of asynchronous cells comprise a second plurality of empty cells.

7. The method of claim 1, wherein the second plurality of asynchronous cells comprise a second plurality of asynchronous transfer mode (ATM) cells.

8. The method of claim 1, wherein the first plurality of asynchronous cells comprise a first plurality of asynchronous transfer mode (ATM) cells.

9. The method of claim 1, wherein the plurality of time multiplexed cells comprise a plurality of time division multiplexed (TDM) cells.

10. The method of claim 1, wherein the frame comprises a synchronous optical network (SONET) frame.

11. A method of scheduling a plurality of cells in a temporal sequence in a frame consisting of a first subframe and a second subframe subsequent to the first subframe, the method comprising the steps of:
    (a) assigning a first plurality of asynchronous cells and a plurality of time multiplexed cells to the first subframe, the time multiplexed cells arranged in clusters each consisting of a fixed number of time multiplexed cells, the clusters of time multiplexed cells temporally interspersed from each other by a fixed number of the first plurality of asynchronous cells; and
    (b) assigning a second plurality of asynchronous cells to the second subframe.

12. The method of claim 11, wherein each of the clusters of time multiplexed cells and each of the first plurality of asynchronous cells have an equal duration.

13. The method of claim 11, wherein the fixed number of time multiplexed cells in each of the clusters is 1.5.

14. The method of claim 11, wherein the first and second subframes have first and second subframe durations, respectively, the first subframe duration being three times the second subframe duration.

15. The method of claim 11, wherein the first and second subframes have first and second subframe durations, respectively, the first subframe duration being less than three times the second subframe duration.

16. The method of claim 11, wherein the fixed number of the first plurality of asynchronous cells is at least one.

17. The method of claim 11, wherein the first plurality of asynchronous cells comprise a first plurality of empty cells.

18. The method of claim 11, wherein the second plurality of asynchronous cells comprise a second plurality of empty cells.

19. The method of claim 11, wherein the second plurality of asynchronous cells comprise a second plurality of asynchronous transfer mode (ATM) cells.

20. The method of claim 11, wherein the first plurality of asynchronous cells comprise a first plurality of asynchronous transfer mode (ATM) cells.

21. The method of claim 11, wherein the plurality of time multiplexed cells comprise a plurality of time division multiplexed (TDM) cells.

22. The method of claim 11, wherein the frame comprises a synchronous optical network (SONET) frame.

23. A method of scheduling a plurality of cells in a temporal sequence in a frame, comprising the steps of:
    (a) dividing the frame into a first subframe and a second subframe subsequent to the first subframe, the first and second subframes consisting of first and second numbers of cells, respectively, the first number of cells being at most three times the second number of cells;
    (b) assigning a plurality of time multiplexed cells and a first plurality of asynchronous cells to the first subframe, the time multiplexed cells temporally interspersed from each other by a fixed number of the first plurality of asynchronous cells; and
    (c) assigning a second plurality of asynchronous cells to the second subframe.

24. The method of claim 23, wherein the fixed number of the first plurality of asynchronous cells is at least one.

25. The method of claim 23, wherein the first plurality of asynchronous cells comprise a first plurality of empty cells.

26. The method of claim 23, wherein the second plurality of asynchronous cells comprise a second plurality of empty cells.

27. The method of claim 23, wherein the second plurality of asynchronous cells comprise a second plurality of asynchronous transfer mode (ATM) cells.

28. The method of claim 23, wherein the first plurality of asynchronous cells comprise a first plurality of asynchronous transfer mode (ATM) cells.

29. The method of claim 23, wherein the plurality of time multiplexed cells comprise a plurality of time division multiplexed (TDM) cells.

30. The method of claim 23, wherein the frame comprises a synchronous optical network (SONET) frame.

31. A method of scheduling a plurality of cells in a temporal sequence in a frame, comprising the steps of:
   (a) dividing the frame into a first subframe and a second subframe subsequent to the first subframe, the first and second subframes having first and second subframe durations, respectively, the first subframe duration being at most three times the second subframe duration;
   (b) assigning a first plurality of asynchronous cells and a plurality of time multiplexed cells to the first subframe, the time multiplexed cells arranged in clusters each consisting of a fixed number of time multiplexed cells, the clusters of time multiplexed cells temporally interspersed from each other by a fixed number of the first plurality of asynchronous cells; and
   (c) assigning a second plurality of asynchronous cells to the second subframe.

32. The method of claim 31, wherein each of the clusters of time multiplexed cells and each of the first plurality of asynchronous cells have an equal duration.

33. The method of claim 31, wherein the fixed number of time multiplexed cells in each of the clusters is 1.5.

34. The method of claim 31, wherein the fixed number of the first plurality of asynchronous cells is at least one.

35. The method of claim 31, wherein the first plurality of asynchronous cells comprise a first plurality of empty cells.

36. The method of claim 31, wherein the second plurality of asynchronous cells comprise a second plurality of empty cells.

37. The method of claim 31, wherein the second plurality of asynchronous cells comprise a second plurality of asynchronous transfer mode (ATM) cells.

38. The method of claim 31, wherein the first plurality of asynchronous cells comprise a first plurality of asynchronous transfer mode (ATM) cells.

39. The method of claim 31, wherein the plurality of time multiplexed cells comprise a plurality of time division multiplexed (TDM) cells.

40. The method of claim 31, wherein the frame comprises a synchronous optical network (SONET) frame.

41. A method of scheduling a plurality of cells in a temporal sequence in a frame, comprising the steps of:
   (a) dividing the frame into a first subframe and a second subframe subsequent to the first subframe, the first and second subframes having first and second subframe durations, respectively, the first subframe duration being at most three times the second subframe duration;
   (b) assigning a first plurality of asynchronous cells and a plurality of time multiplexed cells to the first subframe, the time multiplexed cells arranged in clusters each consisting of a fixed number of time multiplexed cells, each of the clusters of time multiplexed cells and each of the first plurality of asynchronous cells having an equal duration, the clusters of time multiplexed cells temporally interspersed from each other by a fixed number of the first plurality of asynchronous cells; and
   (c) assigning a second plurality of asynchronous cells to the second subframe.

42. The method of claim 41, wherein the fixed number of time multiplexed cells in each of the clusters is 1.5.

43. The method of claim 41, wherein the fixed number of the first plurality of asynchronous cells is at least one.

44. The method of claim 41, wherein the first plurality of asynchronous cells comprise a first plurality of empty cells.

45. The method of claim 41, wherein the second plurality of asynchronous cells comprise a second plurality of empty cells.

46. The method of claim 41, wherein the second plurality of asynchronous cells comprise a second plurality of asynchronous transfer mode (ATM) cells.

47. The method of claim 41, wherein the first plurality of asynchronous cells comprise a first plurality of asynchronous transfer mode (ATM) cells.

48. The method of claim 41, wherein the plurality of time multiplexed cells comprise a plurality of time division multiplexed (TDM) cells.

49. The method of claim 41, wherein the frame comprises a synchronous optical network (SONET) frame.

50. A method of scheduling a plurality of cells in a temporal sequence in a synchronous frame, comprising the steps of:
   (a) dividing the frame into a first subframe and a second subframe subsequent to the first subframe, the first and second subframes having first and second subframe durations, respectively, the first subframe duration being at most three times the second subframe duration;
   (b) assigning a first plurality of asynchronous transfer mode (ATM) cells and a plurality of time division multiplexed (TDM) cells to the first subframe, the TDM cells arranged in clusters each consisting of 1.5 TDM cells, each of the clusters of TDM cells and each of the first plurality of ATM cells having an equal duration, the clusters of TDM cells temporally interspersed from each other by a fixed number of the first plurality of ATM cells; and
   (c) assigning a second plurality of ATM cells to the second subframe.

51. The method of claim 50, wherein the first plurality of AIM cells comprise a first plurality of empty cells.

52. The method of claim 50, wherein the second plurality of ATM cells comprise a second plurality of empty cells.

53. A method of scheduling a plurality of cells in a temporal sequence in a frame, comprising the steps of:
   (a) dividing the frame into a first subframe and a second subframe subsequent to the first subframe, the first and second subframes consisting of first and second numbers of cells, respectively, the first number of cells being at most three times the second number of cells;
   (b) assigning a plurality of time division multiplexed (TDM) cells and a first plurality of asynchronous transfer mode (ATM) cells to the first subframe, the TDM cells temporally interspersed from each other by a fixed number of the first plurality of ATM cells; and
   (c) assigning a second plurality of AIM cells to the second subframe.

54. The method of claim 53, wherein the first plurality of ATM cells comprise a first plurality of empty cells.

55. The method of claim 53, wherein the second plurality of ATM cells comprise a second plurality of empty cells.

* * * * *